(12) United States Patent
Xu et al.

(10) Patent No.: US 10,519,778 B2
(45) Date of Patent: *Dec. 31, 2019

(54) GAS TURBINE ENGINE COMPONENT WITH CONVERGING/DIVERGING COOLING PASSAGE

(71) Applicant: United Technologies Corporation, Hartford, CT (US)

(72) Inventors: JinQuan Xu, East Greenwich, RI (US); Glenn Levasseur, Colchester, CT (US)

(73) Assignee: United Technologies Corporation, Farmington, CT (US)

( * ) Notice: Subject to any disclaimer, the term of this patent is extended or adjusted under 35 U.S.C. 154(b) by 205 days.

This patent is subject to a terminal disclaimer.

(21) Appl. No.: 15/007,775

(22) Filed: Jan. 27, 2016

(65) Prior Publication Data

US 2016/0153283 A1   Jun. 2, 2016

Related U.S. Application Data

(63) Continuation of application No. 13/544,210, filed on Jul. 9, 2012, now Pat. No. 9,279,330.

(Continued)

(51) Int. Cl.
*F01D 5/18* (2006.01)
*F01D 9/04* (2006.01)
*F01D 25/12* (2006.01)

(52) U.S. Cl.
CPC ............ *F01D 5/186* (2013.01); *F01D 9/041* (2013.01); *F01D 25/12* (2013.01);
(Continued)

(58) Field of Classification Search
CPC . F01D 5/186; F01D 5/187; F01D 9/06; F05D 2240/81; F05D 2260/202; F05D 2250/20; F05D 2250/52; Y02T 50/676
See application file for complete search history.

(56) References Cited

U.S. PATENT DOCUMENTS 4,197,443 A    4/1980  Sidenstick
4,529,358 A    7/1985  Papell
(Continued)

FOREIGN PATENT DOCUMENTS

EP    0959228 A1   11/1999
EP    1326007 A2    7/2003
EP    1609949 A1   12/2005

OTHER PUBLICATIONS

Kusterer, K. et al. "The Nekomimi Cooling Technology: Cooling Holes with Ears for High-Efficient Film Cooling" Proceedings of ASME Turbo Expo 2011, Jun. 6-10, 2011. 11 pages.

(Continued)

*Primary Examiner* — Dwayne J White
*Assistant Examiner* — Danielle M. Christensen
(74) *Attorney, Agent, or Firm* — Kinney & Lange, P.A.

(57) ABSTRACT

A component for a gas turbine engine includes a gas path wall having a first surface and a second surface and a cooling hole extending through the gas path wall from the first surface to the second surface. The cooling hole includes an inlet portion having an inlet at the first surface, an outlet portion having an outlet at the second surface, and a transition defined between the inlet and the outlet. The inlet portion converges in a first direction from the inlet to the transition and diverges in a second direction from the inlet to the transition. The outlet portion diverges at least in one of the first and second directions from the transition to the outlet.

1 Claim, 7 Drawing Sheets

Related U.S. Application Data

(60) Provisional application No. 61/599,359, filed on Feb. 15, 2012.

(52) U.S. Cl.
CPC ...... *F05D 2220/32* (2013.01); *F05D 2250/14* (2013.01); *F05D 2250/20* (2013.01); *F05D 2250/52* (2013.01); *F05D 2250/70* (2013.01); *F05D 2260/202* (2013.01); *F05D 2260/2212* (2013.01); *Y02T 50/676* (2013.01)

(56) References Cited

U.S. PATENT DOCUMENTS

| | | | |
|---|---|---|---|
| 4,622,821 A | 11/1986 | Madden | |
| 4,653,279 A | 3/1987 | Reynolds | |
| 4,653,983 A | 3/1987 | Vehr | |
| 4,672,727 A | 6/1987 | Field | |
| 4,684,323 A | 8/1987 | Field | |
| 4,700,544 A | 10/1987 | Fucci | |
| 4,738,588 A | 4/1988 | Field | |
| 4,992,025 A * | 2/1991 | Stroud | B23K 26/388 415/115 |
| 5,062,768 A | 11/1991 | Marriage | |
| 5,096,379 A | 3/1992 | Stroud et al. | |
| 5,129,231 A | 7/1992 | Becker et al. | |
| 5,252,026 A | 10/1993 | Shepherd | |
| 5,326,224 A | 7/1994 | Lee et al. | |
| 5,358,374 A | 10/1994 | Correia et al. | |
| 5,382,133 A | 1/1995 | Moore et al. | |
| 5,418,345 A | 5/1995 | Adamski | |
| 5,419,681 A | 5/1995 | Lee | |
| 5,609,779 A | 3/1997 | Crow et al. | |
| 5,651,662 A | 7/1997 | Lee et al. | |
| 5,660,525 A | 8/1997 | Lee et al. | |
| 5,683,600 A | 11/1997 | Kelley et al. | |
| 5,813,836 A | 9/1998 | Starkweather | |
| 6,139,258 A | 10/2000 | Lang, III et al. | |
| 6,183,199 B1 | 2/2001 | Beeck et al. | |
| 6,241,468 B1 | 6/2001 | Lock et al. | |
| 6,243,948 B1 | 6/2001 | Lee et al. | |
| 6,267,552 B1 * | 7/2001 | Weigand | F01D 5/186 415/115 |
| 6,287,075 B1 | 9/2001 | Kercher | |
| 6,307,175 B1 | 10/2001 | Blochlinger et al. | |
| 6,494,678 B1 | 12/2002 | Bunker | |
| 6,547,524 B2 | 4/2003 | Kohli et al. | |
| 6,572,335 B2 | 6/2003 | Kuwabara et al. | |
| 6,744,010 B1 | 6/2004 | Pepe et al. | |
| 6,944,580 B1 | 9/2005 | Blume et al. | |
| 6,973,419 B1 | 12/2005 | Fortin et al. | |
| 6,979,176 B2 | 12/2005 | Nakamata et al. | |
| 7,186,085 B2 | 3/2007 | Lee | |
| 7,273,351 B2 | 9/2007 | Kopmels | |
| 7,328,580 B2 | 2/2008 | Lee et al. | |
| 7,374,401 B2 | 5/2008 | Lee | |
| 7,578,653 B2 | 8/2009 | Klasing et al. | |
| 7,726,131 B2 | 6/2010 | Sze et al. | |
| 7,766,609 B1 | 8/2010 | Liang | |
| 7,887,294 B1 | 2/2011 | Liang | |
| 7,997,868 B1 | 8/2011 | Liang | |
| 8,038,399 B1 | 10/2011 | Liang | |
| 8,057,181 B1 | 11/2011 | Liang | |
| 2001/0036401 A1 | 11/2001 | Harvey et al. | |
| 2002/0159888 A1 | 10/2002 | Rinck et al. | |
| 2005/0106020 A1 | 5/2005 | Bunker et al. | |
| 2005/0286998 A1 | 12/2005 | Lee et al. | |
| 2008/0003096 A1 | 1/2008 | Kohli et al. | |
| 2008/0145208 A1 | 6/2008 | Klasing et al. | |
| 2009/0013695 A1 | 1/2009 | Dierberger et al. | |
| 2009/0304499 A1 | 12/2009 | Strock et al. | |
| 2010/0008759 A1 * | 1/2010 | Johns | F01D 5/186 415/115 |
| 2010/0068032 A1 | 3/2010 | Liang | |
| 2010/0068067 A1 | 3/2010 | Liang | |
| 2010/0282721 A1 | 11/2010 | Bunker et al. | |
| 2011/0097191 A1 | 4/2011 | Bunker | |
| 2011/0185572 A1 | 8/2011 | Wei et al. | |
| 2011/0293423 A1 | 12/2011 | Bunker et al. | |
| 2012/0051941 A1 | 3/2012 | Bunker | |
| 2012/0167389 A1 | 7/2012 | Lacy et al. | |

OTHER PUBLICATIONS

The International Search Report dated Jul. 18, 2013 for International application No. PCT/US2013/025881, 14 pages.

European Patent Office, European Search report, dated Nov. 27, 2015, 7 pages.

\* cited by examiner

GAS TURBINE ENGINE COMPONENT WITH CONVERGING/DIVERGING COOLING PASSAGE

CROSS REFERENCE TO RELATED APPLICATION

This application is a continuation of U.S. patent application Ser. No. 13/544,210, filed Jul. 9, 2012, which claims priority from U.S. Provisional Application No. 61/599,359, filed Feb. 15, 2012, and entitled "Gas Turbine Engine Component with Converging/Diverging Cooling Passage", the disclosure of which is incorporated by reference in its entirety.

BACKGROUND

This invention relates generally to turbomachinery, and specifically to turbine flow path components for gas turbine engines. In particular, the invention relates to cooling techniques for airfoils and other gas turbine engine components exposed to hot working fluid flow, including, but not limited to, rotor blades and stator vane airfoils, endwall surfaces including platforms, shrouds and compressor and turbine casings, combustor liners, turbine exhaust assemblies, thrust augmentors and exhaust nozzles.

Gas turbine engines are rotary-type combustion turbine engines built around a power core made up of a compressor, combustor and turbine, arranged in flow series with an upstream inlet and downstream exhaust. The compressor section compresses air from the inlet, which is mixed with fuel in the combustor and ignited to generate hot combustion gas. The turbine section extracts energy from the expanding combustion gas, and drives the compressor section via a common shaft. Expanded combustion products are exhausted downstream, and energy is delivered in the form of rotational energy in the shaft, reactive thrust from the exhaust, or both.

Gas turbine engines provide efficient, reliable power for a wide range of applications in aviation, transportation and industrial power generation. Small-scale gas turbine engines typically utilize a one-spool design, with co-rotating compressor and turbine sections. Larger-scale combustion turbines including jet engines and industrial gas turbines (IGTs) are generally arranged into a number of coaxially nested spools. The spools operate at different pressures, temperatures and spool speeds, and may rotate in different directions.

Individual compressor and turbine sections in each spool may also be subdivided into a number of stages, formed of alternating rows of rotor blade and stator vane airfoils. The airfoils are shaped to turn, accelerate and compress the working fluid flow, or to generate lift for conversion to rotational energy in the turbine.

Industrial gas turbines often utilize complex nested spool configurations, and deliver power via an output shaft coupled to an electrical generator or other load, typically using an external gearbox. In combined cycle gas turbines (CCGTs), a steam turbine or other secondary system is used to extract additional energy from the exhaust, improving thermodynamic efficiency. Gas turbine engines are also used in marine and land-based applications, including naval vessels, trains and armored vehicles, and in smaller-scale applications such as auxiliary power units.

Aviation applications include turbojet, turbofan, turboprop and turboshaft engine designs. In turbojet engines, thrust is generated primarily from the exhaust. Modern fixed-wing aircraft generally employ turbofan and turboprop configurations, in which the low pressure spool is coupled to a propulsion fan or propeller. Turboshaft engines are employed on rotary-wing aircraft, including helicopters, typically using a reduction gearbox to control blade speed. Unducted (open rotor) turbofans and ducted propeller engines also known, in a variety of single-rotor and contra-rotating designs with both forward and aft mounting configurations.

Aviation turbines generally utilize two and three-spool configurations, with a corresponding number of coaxially rotating turbine and compressor sections. In two-spool designs, the high pressure turbine drives a high pressure compressor, forming the high pressure spool or high spool. The low-pressure turbine drives the low spool and fan section, or a shaft for a rotor or propeller. In three-spool engines, there is also an intermediate pressure spool. Aviation turbines are also used to power auxiliary devices including electrical generators, hydraulic pumps and elements of the environmental control system, for example using bleed air from the compressor or via an accessory gearbox.

Additional turbine engine applications and turbine engine types include intercooled, regenerated or recuperated and variable cycle gas turbine engines, and combinations thereof. In particular, these applications include intercooled turbine engines, for example with a relatively higher pressure ratio, regenerated or recuperated gas turbine engines, for example with a relatively lower pressure ratio or for smaller-scale applications, and variable cycle gas turbine engines, for example for operation under a range of flight conditions including subsonic, transonic and supersonic speeds. Combined intercooled and regenerated/recuperated engines are also known, in a variety of spool configurations with traditional and variable cycle modes of operation.

Turbofan engines are commonly divided into high and low bypass configurations. High bypass turbofans generate thrust primarily from the fan, which accelerates airflow through a bypass duct oriented around the engine core. This design is common on commercial aircraft and transports, where noise and fuel efficiency are primary concerns. The fan rotor may also operate as a first stage compressor, or as a pre-compressor stage for the low-pressure compressor or booster module. Variable-area nozzle surfaces can also be deployed to regulate the bypass pressure and improve fan performance, for example during takeoff and landing. Advanced turbofan engines may also utilize a geared fan drive mechanism to provide greater speed control, reducing noise and increasing engine efficiency, or to increase or decrease specific thrust.

Low bypass turbofans produce proportionally more thrust from the exhaust flow, generating greater specific thrust for use in high-performance applications including supersonic jet aircraft. Low bypass turbofan engines may also include variable-area exhaust nozzles and afterburner or augmentor assemblies for flow regulation and short-term thrust enhancement. Specialized high-speed applications include continuously afterburning engines and hybrid turbojet/ramjet configurations.

Across these applications, turbine performance depends on the balance between higher pressure ratios and core gas path temperatures, which tend to increase efficiency, and the related effects on service life and reliability due to increased stress and wear. This balance is particularly relevant to gas turbine engine components in the hot sections of the compressor, combustor, turbine and exhaust sections, where active cooling is required to prevent damage due to high gas path temperatures and pressures.

SUMMARY

This invention concerns a component for a gas turbine engine that includes a gas path wall having a first surface and a second surface and a cooling hole extending through the gas path wall from the first surface to the second surface. The cooling hole includes an inlet portion having an inlet at the first surface, an outlet portion having an outlet at the second surface, and a transition defined between the inlet and the outlet. The inlet portion converges in a first direction from the inlet to the transition and diverges in a second direction from the inlet to the transition. The outlet portion diverges at least in one of the first and second directions from the transition to the outlet.

Another embodiment of the present invention is an airfoil that includes a wall having a first surface and a second surface that is exposed to hot working fluid flow. A cooling hole includes a metering section having an inlet at the first surface, a diffusing section having an outlet at the second surface, and a transition defined between the inlet and the outlet. The metering section converges in a first direction from the inlet to the transition, and diverges in a second direction from the inlet to the transition. The diffusing section diverges at least in one of the first and second directions from the transition to the outlet.

Another embodiment of the present invention is a gas turbine engine component that includes a gas path wall having a first surface and a second surface and a cooling hole extending through the gas path wall. The cooling hole has an inlet portion with an inlet in the first surface, an outlet portion with an outlet in the second surface, and a transition defined between the inlet portion and the outlet portion. A first cooling hole surface extends along the cooling hole. The first cooling hole surface is substantially straight from the inlet through the transition to the outlet. A second cooling hole surface extending along the cooling hole opposite the first cooling hole surface. The second cooling hole surface converges toward the first cooling hole surface from the inlet to the transition and diverges away from the first cooling hole surface from the transition to the outlet.

Another embodiment of the present invention is a component for a gas turbine engine. The component includes a flow path wall having a first surface and a second surface. The first surface is exposed to cooling fluid and the second surface is exposed to hot working fluid. A cooling hole includes a metering section having an inlet at the first surface, a diffusing section having an outlet at the second surface, and a transition defined between the inlet and the outlet. An upstream surface of the cooling hole is substantially straight from the inlet to the outlet. A downstream surface of the cooling hole converges toward the upstream surface from the inlet to the transition and diverges away from the upstream surface from the transition to the outlet.

DETAILED DESCRIPTION

Figure 1:
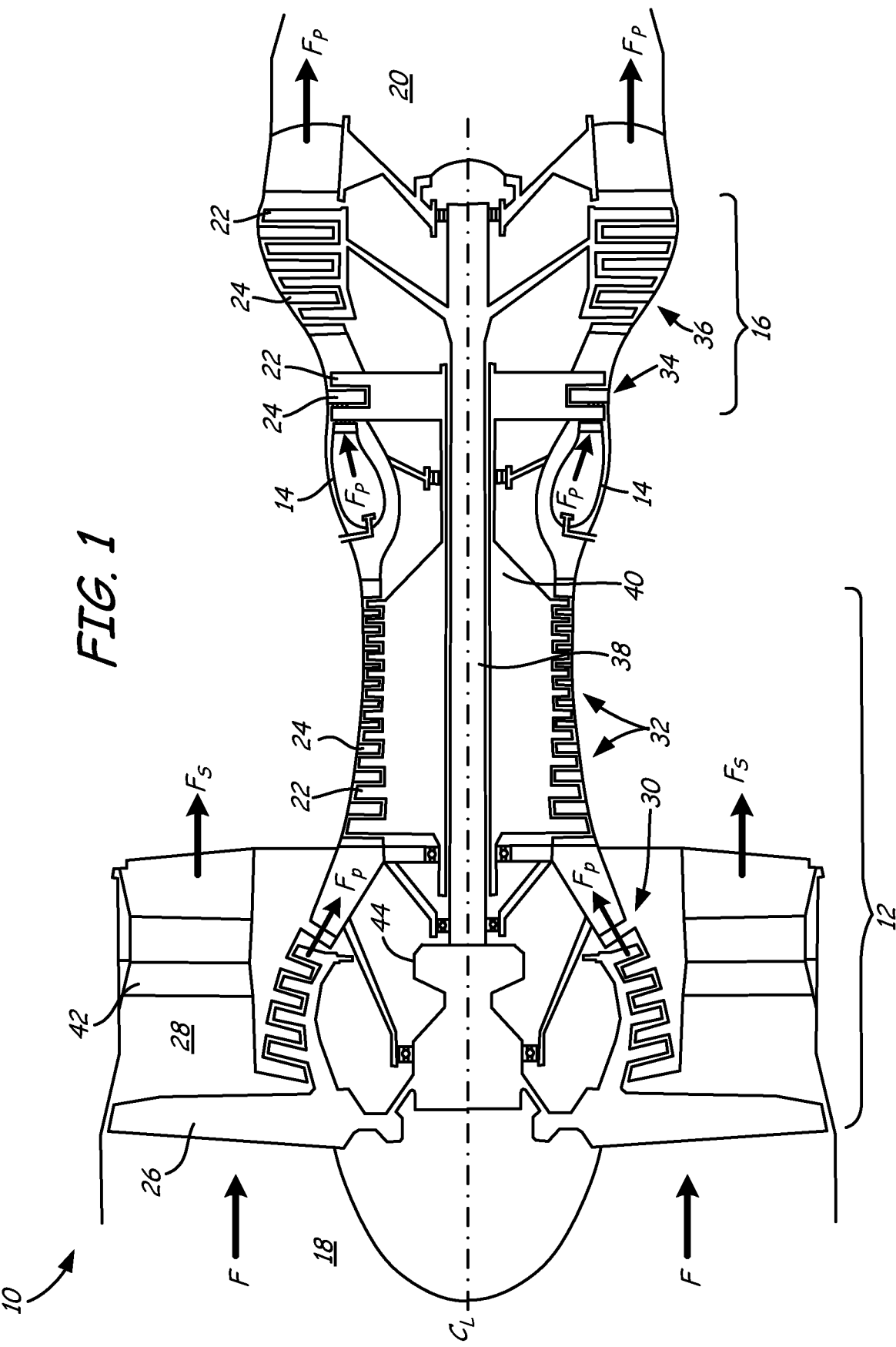
FIG. 1 is a cross-sectional view of a gas turbine engine.

FIG. 1 is a cross-sectional view of gas turbine engine 10. Gas turbine engine (or turbine engine) 10 includes a power core with compressor section 12, combustor 14 and turbine section 16 arranged in flow series between upstream inlet 18 and downstream exhaust 20. Compressor section 12 and turbine section 16 are arranged into a number of alternating stages of rotor airfoils (or blades) 22 and stator airfoils (or vanes) 24.

In the turbofan configuration of FIG. 1, propulsion fan 26 is positioned in bypass duct 28, which is coaxially oriented about the engine core along centerline (or turbine axis) $C_L$. An open-rotor propulsion stage 26 may also provided, with turbine engine 10 operating as a turboprop or unducted turbofan engine. Alternatively, fan rotor 26 and bypass duct 28 may be absent, with turbine engine 10 configured as a turbojet or turboshaft engine, or an industrial gas turbine.

For improved service life and reliability, components of gas turbine engine 10 are provided with an improved cooling configuration, as described below. Suitable components for the cooling configuration include rotor airfoils 22, stator airfoils 24 and other gas turbine engine components exposed to hot gas flow, including, but not limited to, platforms, shrouds, casings and other endwall surfaces in hot sections of compressor 12 and turbine 16, and liners, nozzles, afterburners, augmentors and other gas wall components in combustor 14 and exhaust section 20.

In the two-spool, high bypass configuration of FIG. 1, compressor section 12 includes low pressure compressor (LPC) 30 and high pressure compressor (HPC) 32, and turbine section 16 includes high pressure turbine (HPT) 34 and low pressure turbine (LPT) 36. Low pressure compressor 30 is rotationally coupled to low pressure turbine 36 via low pressure (LP) shaft 38, forming the LP spool or low spool. High pressure compressor 32 is rotationally coupled to high pressure turbine 34 via high pressure (HP) shaft 40, forming the HP spool or high spool.

Flow F at inlet 18 divides into primary (core) flow $F_P$ and secondary (bypass) flow $F_S$ downstream of fan rotor 26. Fan rotor 26 accelerates secondary flow $F_S$ through bypass duct 28, with fan exit guide vanes (FEGVs) 42 to reduce swirl and improve thrust performance. In some designs, structural guide vanes (SGVs) 42 are used, providing combined flow turning and load bearing capabilities.

Primary flow $F_P$ is compressed in low pressure compressor 30 and high pressure compressor 32, then mixed with fuel in combustor 14 and ignited to generate hot combustion gas. The combustion gas expands to provide rotational energy in high pressure turbine 34 and low pressure turbine 36, driving high pressure compressor 32 and low pressure compressor 30, respectively. Expanded combustion gases exit through exhaust section (or exhaust nozzle) 20, which can be shaped or actuated to regulate the exhaust flow and improve thrust performance.

Low pressure shaft 38 and high pressure shaft 40 are mounted coaxially about centerline $C_L$, and rotate at different speeds. Fan rotor (or other propulsion stage) 26 is rotationally coupled to low pressure shaft 38. In advanced designs, fan drive gear system 44 is provided for additional fan speed control, improving thrust performance and efficiency with reduced noise output.

Fan rotor 26 may also function as a first-stage compressor for gas turbine engine 10, and LPC 30 may be configured as an intermediate compressor or booster. Alternatively, propulsion stage 26 has an open rotor design, or is absent, as described above. Gas turbine engine 10 thus encompasses a wide range of different shaft, spool and turbine engine configurations, including one, two and three-spool turboprop and (high or low bypass) turbofan engines, turboshaft engines, turbojet engines, and multi-spool industrial gas turbines.

In each of these applications, turbine efficiency and performance depend on the overall pressure ratio, defined by the total pressure at inlet 18 as compared to the exit pressure of compressor section 12, for example at the outlet of high pressure compressor 32, entering combustor 14. Higher pressure ratios, however, also result in greater gas path temperatures, increasing the cooling loads on rotor airfoils 22, stator airfoils 24 and other components of gas turbine engine 10. To reduce operating temperatures, increase service life and maintain engine efficiency, these components are provided with improved cooling configurations, as described below. Suitable components include, but are not limited to, cooled gas turbine engine components in compressor sections 30 and 32, combustor 14, turbine sections 34 and 36, and exhaust section 20 of gas turbine engine 10.

Figure 2A:
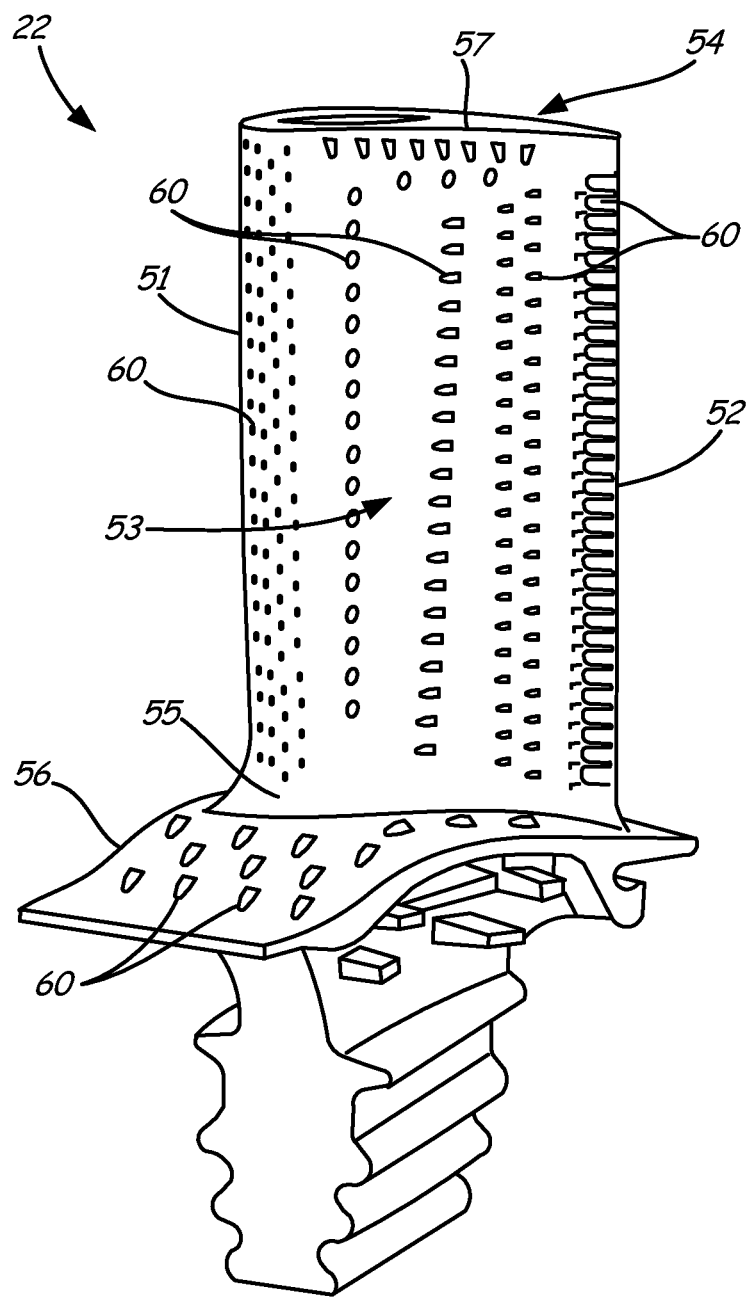
FIG. 2A is a perspective view of an airfoil for the gas turbine engine, in a rotor blade configuration.

FIG. 2A is a perspective view of rotor airfoil (or blade) 22 for gas turbine engine 10, as shown in FIG. 1, or for another turbomachine. Rotor airfoil 22 extends axially from leading edge 51 to trailing edge 52, defining pressure surface 53 (front) and suction surface 54 (back) therebetween.

Pressure and suction surfaces 53 and 54 form the major opposing surfaces or walls of airfoil 22, extending axially between leading edge 51 and trailing edge 52, and radially from root section 55, adjacent inner diameter (ID) platform 56, to tip section 57, opposite ID platform 56. In some designs, tip section 57 is shrouded.

Cooling holes or outlets 60 are provided on one or more surfaces of airfoil 22, for example along leading edge 51, trailing edge 52, pressure (or concave) surface 53, or suction (or convex) surface 54, or a combination thereof. Cooling holes or passages 60 may also be provided on the endwall surfaces of airfoil 22, for example along ID platform 56, or on a shroud or engine casing adjacent tip section 57.

Figure 2B:
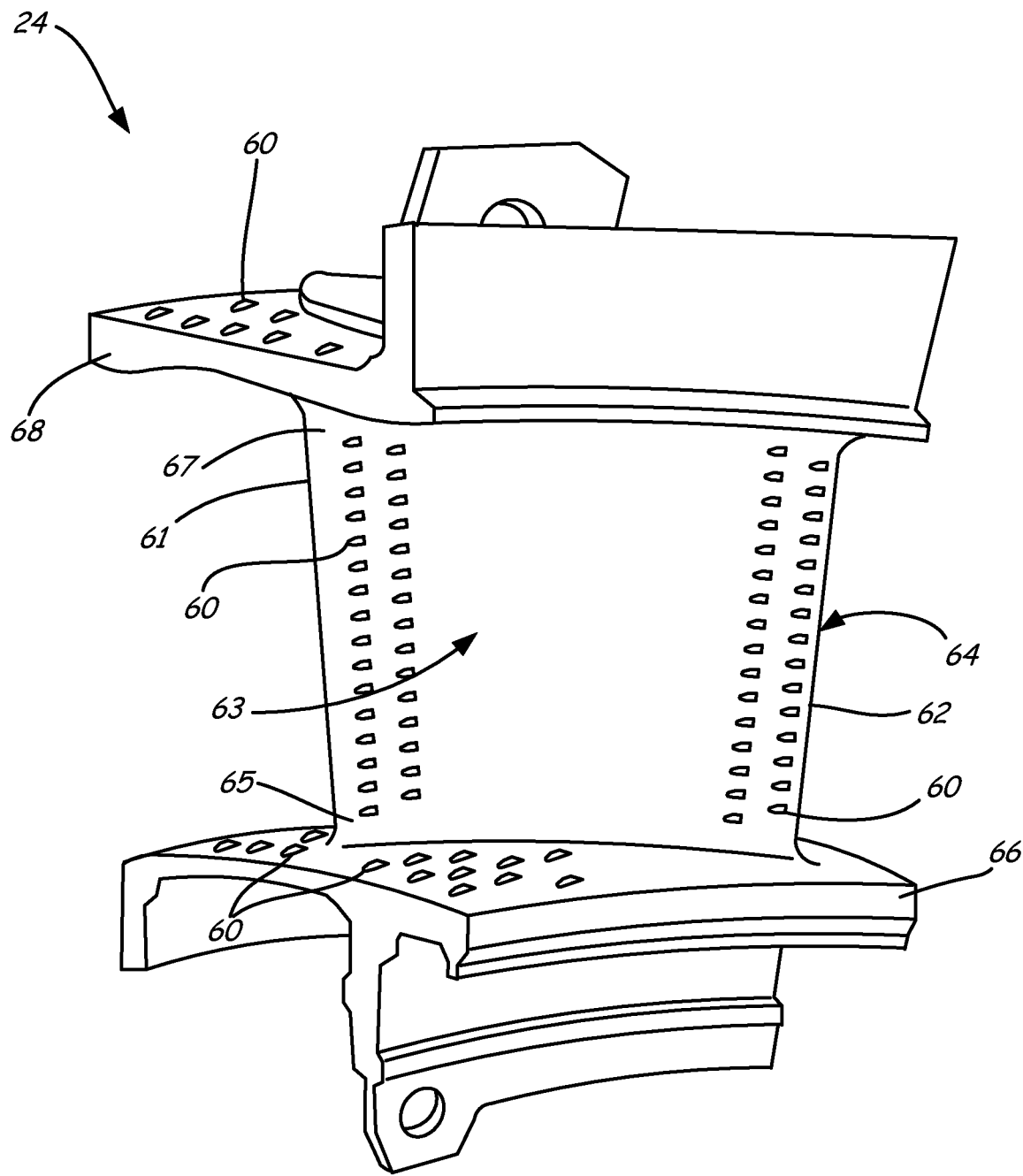
FIG. 2B is a perspective view of an airfoil for the gas turbine engine, in a stator vane configuration.

FIG. 2B is a perspective view of stator airfoil (or vane) 24 for gas turbine engine 10, as shown in FIG. 1, or for another turbomachine. Stator airfoil 24 extends axially from leading edge 61 to trailing edge 62, defining pressure surface 63 (front) and suction surface 64 (back) therebetween. Pressure and suction surfaces 63 and 64 extend from inner (or root) section 65, adjacent ID platform 66, to outer (or tip) section 67, adjacent outer diameter (OD) platform 68.

Cooling holes or outlets 60 are provided along one or more surfaces of airfoil 24, for example leading or trailing edge 61 or 62, pressure (concave) or suction (convex) surface 63 or 64, or a combination thereof. Cooling holes or passages 60 may also be provided on the endwall surfaces of airfoil 24, for example along ID platform 66 and OD platform 68.

Rotor airfoils 22 (FIG. 2A) and stator airfoils 24 (FIG. 2B) are formed of high strength, heat resistant materials such as high temperature alloys and superalloys, and are provided with thermal and erosion-resistant coatings. Airfoils 22 and 24 are also provided with internal cooling passages and cooling holes 60 to reduce thermal fatigue and wear, and to prevent melting when exposed to hot gas flow in the higher temperature regions of a gas turbine engine or other turbomachine. Cooling holes 60 deliver cooling fluid (e.g., steam or air from a compressor) through the outer walls and platform structures of airfoils 22 and 24, creating a thin layer (or film) of cooling fluid to protect the outer (gas path) surfaces from high temperature flow.

While surface cooling extends service life and increases reliability, injecting cooling fluid into the gas path also reduces engine efficiency, and the cost in efficiency increases with the required cooling flow. Cooling holes 60 are thus provided with improved metering and inlet geometry to reduce jets and blow off, and improved diffusion and exit geometry to reduce flow separation and corner effects. Cooling holes 60 reduce flow requirements and improve the spread of cooling fluid across the hot surfaces of airfoils 22 and 24, and other gas turbine engine components, so that less flow is needed for cooling and efficiency is maintained or increased.

Figure 3A:
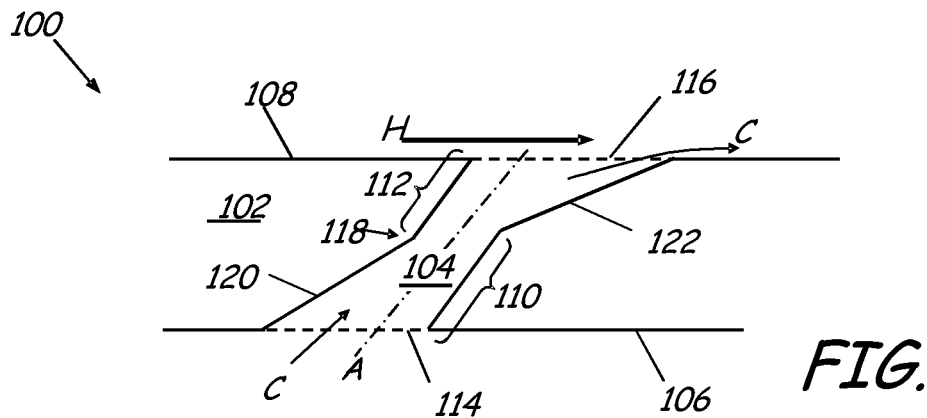
FIG. 3A is a cross-sectional view of the gas path wall for a cooled gas turbine engine component, taken in a longitudinal direction.

FIG. 3A is a cross-sectional view of gas turbine engine component (turbine or turbomachinery component) 100 with gas path wall 102, taken in a longitudinal direction and that carries a cool first surface 106 and an opposite, hot, second surface 108. Cooling hole 104 extends through gas path wall 102 from first surface 106 to second surface 108 to form cooling hole 60 in, for example the outer wall of an airfoil, casing, combustor liner, exhaust nozzle or other gas turbine engine component, as described above.

Gas path wall 102 of component 100 is exposed to cooling fluid on first surface 106 with longitudinal hot gas or working fluid flow H along second surface 108. In some components, for example airfoils, first surface 106 is an inner surface (or inner wall) and second surface 108 is an outer surface (or outer wall). In other components, for example combustor liners and exhaust nozzles, first surface 106 is an outer surface (or outer wall), and second surface 108 is an inner surface (or inner wall). More generally, the terms inner and outer are merely representative, and may be interchanged.

Cooling hole 104 delivers cooling fluid C from first surface 106 of wall 102 to second surface 108, for example to provide diffusive flow and film cooling. Cooling hole 104 is also inclined along axis A in a downstream direction, in order to improve cooling fluid coverage over second surface 108, with less separation and reduced flow mixing.

Axis A is an approximate longitudinal axis of flow of metering section 110. Cooling hole 104 includes metering section 110 and diffusing section 112, and extends along axis A from metering section 110 to diffusing section 112. Metering section 110 has inlet 114 at first surface 106 of gas path wall 102, and diffusing section 112 has outlet 116 at second surface 108 of gas path wall 102. Outlet 116 defines a perimeter of diffusing section 112 at an intersection of diffusing section 112 and second surface 108. Surfaces 120, 122, 130, and 132 of cooling hole 104 define cooling hole 104 between inlet 114 and outlet 116.

Transition 118 is defined in the region between metering section 110 and diffusing section 112, where cooling hole 104 becomes divergent (increasing flow area) and where the cooling fluid flow becomes diffusive. Transition 118 may be relatively abrupt or may encompass an extended portion of cooling hole 104, for example in a flow transition region between metering section 110 and diffusing section 112, or over a region of overlap between metering section 110 and diffusing section 112.

As shown in FIG. 3A, metering section 110 of cooling hole 104 converges along axis A between inlet 114 and transition 118, as defined between opposite upstream and downstream boundaries or surfaces 120 and 122. In particular, upstream surface 120 and downstream surface 122 converge toward one another in the longitudinal direction, in the region from inlet 114 through metering section 110 to transition 118. This decreases the cross sectional area (or flow area) of metering section 110, in order to regulate the cooling fluid flow between inlet 114 and outlet 116. Though surfaces 120 and 122 are represented in the cross-sectional view of FIG. 3A with a line, they can be curved as described further below. In the illustrated embodiment, surfaces 120 and 122 are angled with respect to both first surface 106 and second surface 108.

Diffusing section 112 of cooling hole 104 diverges between transition 118 and outlet 116. That is, upstream and downstream surfaces 120 and 122 diverge from one another in the longitudinal direction, in the region from transition 118 through diffusing section 112 to outlet 116. This increases the lateral width of transition 118, and thus the cross sectional area (or flow area) of diffusing section 112, in order to provide diffusive flow between transition 118 and outlet 116.

Figure 3B:
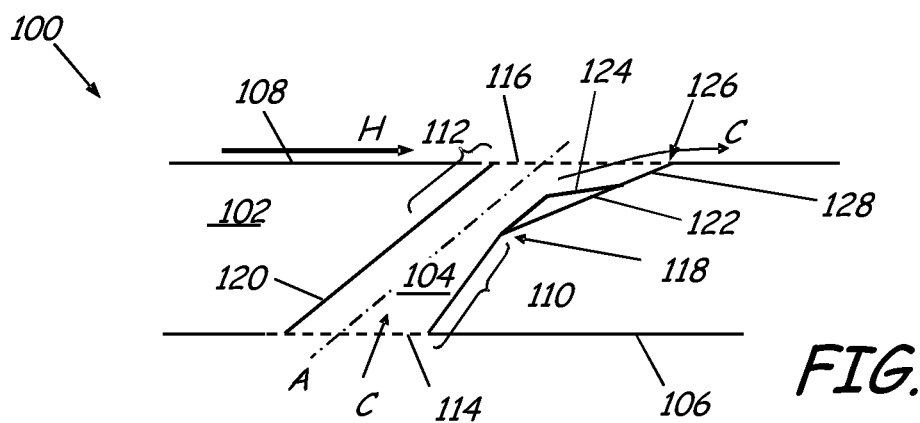
FIG. 3B is an alternate cross-sectional view of the gas path wall, showing the cooling hole geometry.

FIG. 3B is an alternate cross-sectional view of gas path wall 102, showing a different geometry for cooling hole 104. In this design, upstream surface 120 is substantially linear from inlet 114 through transition 118 to outlet 116, in order to decrease flow separation in transition region 118. As shown in the FIG. 3B, axis A of passage 104 may be taken substantially parallel to upstream surface 120.

Regardless of the upstream wall configuration, one or more longitudinal ridges 124 may be formed on downstream surface 122 of diffusing section 112. Longitudinal ridges 124 project out from downstream surface 122 to separate diffusing section 112 of cooling hole 104 into different lobes, discouraging swirl and reducing flow separation as described below with respect to FIGS. 5A and 5B.

Longitudinal ridges 124 form ribs or ridge structures extending along downstream surface 122, for example from transition 118 toward trailing edge (downstream end) 126 of outlet 116, as shown in FIG. 3B. Transition region 128 can extend from longitudinal ridge 124 to trailing edge 126 of outlet 116, in order to reduce separation and improve downstream cooling performance. Transition region 128 may be formed along the surface of downstream surface 122, as described below. Transition region 128 can be flat or planar. Alternatively, transition region 128 can be non-flat and non-planar, such as curved (e.g. convex) longitudinally and/or laterally.

Figure 3C:
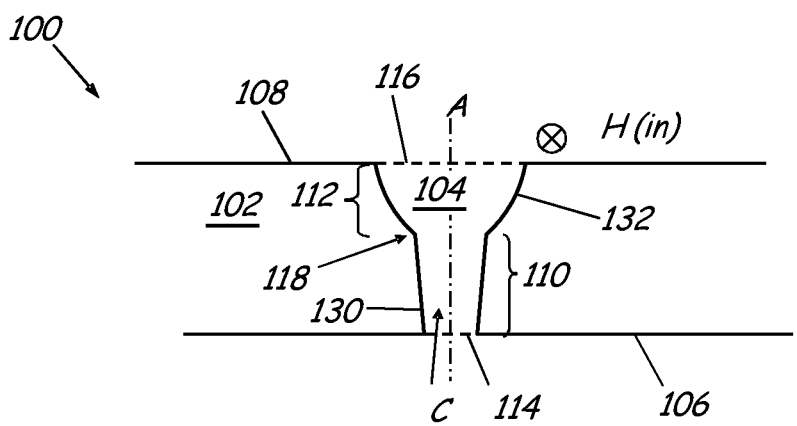
FIG. 3C is a transverse cross-sectional view of the gas path wall.

FIG. 3C is a transverse cross sectional view of gas path wall 102, taken along axis A and looking in a downstream direction, in a plane perpendicular or transverse to the longitudinal cross sections of FIGS. 3A and 3B. In this downstream view, hot gas flow H is directed into the page, and lateral side surfaces 130 and 132 are separated in the transverse direction across axis A, perpendicular to hot gas flow H.

As shown in the FIG. 3C, metering section 110 of cooling hole 104 is divergent in the lateral or transverse direction, and first and second side walls (or lateral boundaries) 130 and 132 diverge from one another (and from axis A) between inlet 114 and transition 118. While metering section 110 is convergent in the longitudinal direction, therefore, as shown in FIG. 3A, metering section 110 is divergent in the transverse direction, as shown in FIG. 3C. Alternatively, metering section 110 can be convergent in the transverse direction and/or divergent in the longitudinal direction, as shown in FIG. 4B.

In metering section 110, first side surface 130 diverges from second side surface 132 at a rate that complements the rate of convergence of upstream and downstream surfaces 120 and 122 (shown in FIGS. 3A and 3B) so that the flow area of metering section 110 either remains constant or decreases from inlet 114 to transition 118. Thus, metering section 110 restricts flow from inlet 114 through transition 118, regulating the flow rate and improving efficiency by providing only the desired level of cooling fluid flow to diffusing section 112, for more efficient cooling and greater coverage along second surface 108 of gas path wall 102, downstream of outlet 116.

In diffusing section 112, side surfaces 130 and 132 diverge laterally from one another (and from axis A) between transition 118 and outlet 116. Thus, diffusing section 112 is divergent in both the longitudinal direction of FIG. 3A, and in the transverse direction of FIG. 3C. This configuration improves diffusive flow between transition 118 and outlet 116, decreasing flow separation at trailing edge 126 and improving cooling performance along second surface 108 of gas path wall 102. In the illustrated embodiment, side surfaces 130 and 132 are angled with respect to both first surface 106 and second surface 108.

Figure 4A:
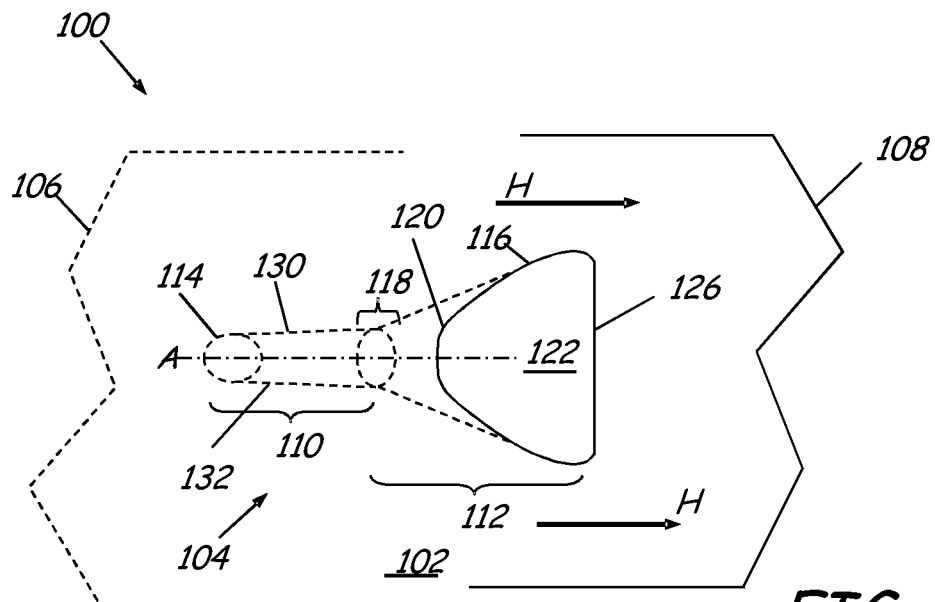
FIG. 4A is a schematic view of the gas path wall, illustrating the cooling hole geometry.
Figure 4B:
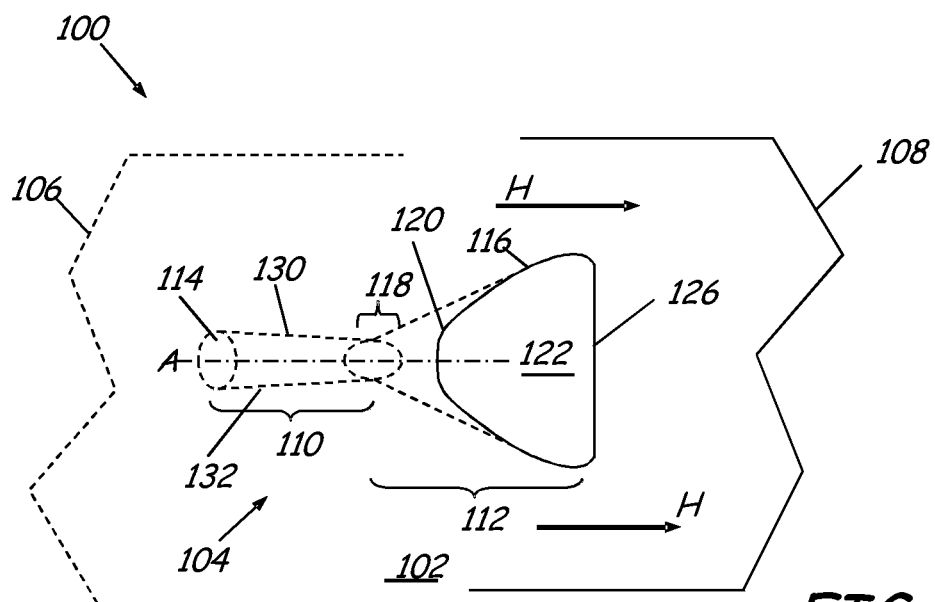
FIG. 4B is a schematic view of the gas path wall, illustrating an alternate cooling hole geometry in the inlet region.

FIG. 4A is a schematic view of gas path wall 102, illustrating the geometry of cooling hole 104 in inlet (metering) portion 110. This is a downward or inward view, looking down on gas path wall 102 and cooling hole 104.

Second surface 108 of gas path wall 102 is exposed to hot gas flow H in a longitudinal and downstream direction, from left to right in FIG. 4A. Cooling hole 104 extends down through gas path wall 102, from outlet 116 at second surface 108 (solid lines) to inlet 114 at first surface 106 (dashed lines). Transition 118 is between inlet 114 and outlet 116. Inlet or metering section 110 of cooling hole 104 extends from inlet 114 to transition 118. Diffusing section 112 of cooling hole 104 extends from transition 118 to outlet 116.

As shown in FIG. 4A, diffusing section 112 of cooling hole 104 diverges (widens) in both the longitudinal direction, along the direction of hot gas flow H, and in the lateral direction, transverse or perpendicular to the direction of hot gas flow H. That is, the longitudinal and lateral dimensions of diffusing section 112 both increase between transition 118 and outlet 116. As a result, the cross sectional (flow) area of cooling hole 104 increases from transition 118 through diffusing section 112 to outlet 116. This configuration promotes diffusive flow in outlet region 112 of cooling hole 104, improving coverage and performance along second surface 108 of gas path wall 102, downstream of outlet 116 at trailing edge 126.

Metering section 110, in contrast, converges (narrows) in the longitudinal direction and diverges (widens) in the lateral direction. That is, the longitudinal dimension of passage 104 decreases between inlet 114 and transition 118, while the transverse dimension increases. The relative convergence and divergence are selected so that the cross sectional (flow) area of metering section 110 decreases, or remains substantially constant, from inlet 114 through metering section 110 to transition 118.

This configuration promotes regulated flow in inlet region 110 of cooling hole 104, in order to expand cooling flow area coverage and improve cooling efficiency. The cross-section of metering section 110 also varies and can be selected to improve cooling efficiency, for example using a circular, elliptical, oblong, or crescent shape, at inlet 114 or transition 118, or a circular, elliptical or oblong cross-sectional geometry between inlet 114 and transition 118.

The configuration of outlet 116 is also selected to improve cooling performance. In the particular configuration of FIG. 4A, for example, outlet 116 is formed as a delta, with arcuate upstream surface 120 extending toward and substantially linear trailing edge 126. Alternatively, trailing edge 126 may be convex.

FIG. 4B is a schematic view of gas path wall 102, illustrating an alternate geometry for metering section 110 of cooling hole 104. As shown in FIG. 3A, the transverse dimension of metering section 110 decreases between inlet 114 and transition 118, while the lateral dimension can increase. Thus, metering section 110 of cooling hole 104 diverges in the longitudinal direction, and converges in the transverse direction. Again, the relative convergence and divergence can be selected so that the cross sectional (flow) area of cooling hole 104 decreases, or remains substantially constant, from inlet 114 through metering section 110 to transition 118.

Figure 5A:
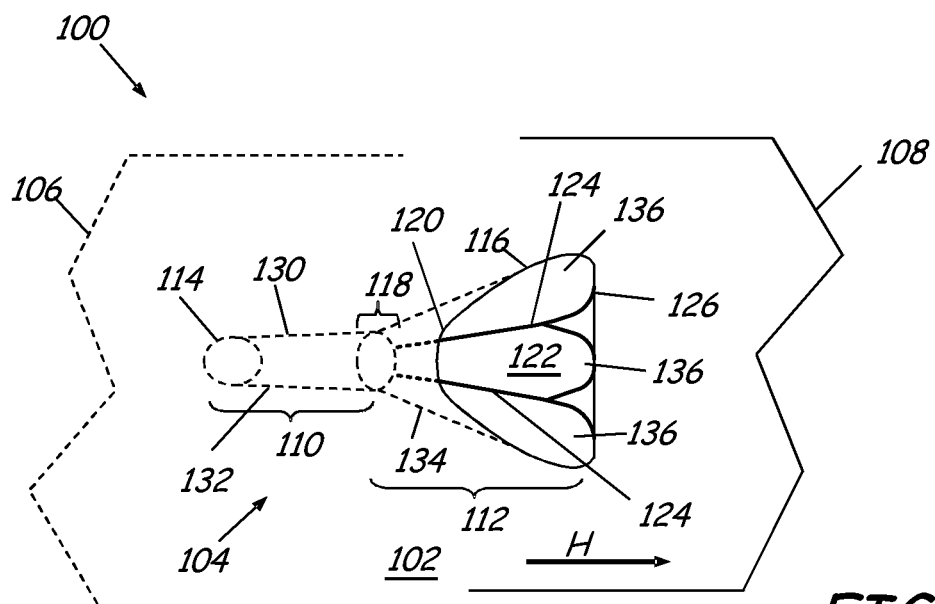
FIG. 5A is a schematic view of the gas path wall, illustrating the cooling hole geometry in the outlet region.

FIG. 5A is a schematic view of gas path wall 102, illustrating the geometry of cooling hole 104 in outlet (diffusion) portion 112. The geometry of outlet 116 is selected to reduce flow separation, particularly along trailing edge 126. In particular, trailing edge 126 is substantially straight or convex in the downstream sense, in order increase laminar flow and decrease flow separation along outer gas path wall surface 108.

FIG. 5A also shows longitudinal ridges 124 in diffusing section 112 of cooling hole 104, extending from transition 118 to trailing edge 126 of outlet 116. Longitudinal ridges 124 project out (upward) from downstream surface 122 of cooling hole 104, dividing diffusing section 112 into multiple lobes 136 and discouraging transverse (swirl or vortex) flow components. This configuration reduces cooling fluid losses and separation at outlet 116, for improved coverage and cooling efficiency along second surface 108 of gas path wall 102, downstream from trailing edge 126 of outlet 116.

For example, longitudinal ridges 124 may be formed at the intersection or interface between adjacent lobes 136, where lobes 136 have arcuate or curved surfaces along downstream surface 122, meeting at convex or cusp-shaped longitudinal ridges 124. Alternatively, longitudinal ridges 124 may be formed at the intersection or interface between adjacent lobes 136 with substantially planar surfaces along downstream surface 122, meeting at a triangular ridge or intersection between planes of different slope in adjacent lobes 136. Lobes 136 are surfaces of wall 102 which define distinct channel-like portions of the void of cooling hole 104 at diffusing section 112. In these designs, longitudinal ridges 124 diverge in the direction from transition 118 toward trailing edge 126 of outlet 116, between diverging (diffusion) segments 134 of lateral side surfaces 130 and 132.

The geometries of longitudinal ridge or divider processes 124 thus vary. Longitudinal ridges 124 may also be formed as long, narrow features extending along the wall of cooling hole 104, for example where two sloping sides (e.g., of lobes 136) meet, or as a narrow raised band or rib structure. Longitudinal ridges 124 may also be either substantially pointed or rounded, for example where two curved lobe or wall surfaces meet, or where the direction of curvature reverses along the wall of cooling hole 104. Longitudinal ridges 124 may also be formed as arched or cone-shape features, for example at the boundary of two lobes 136.

Figure 5B:
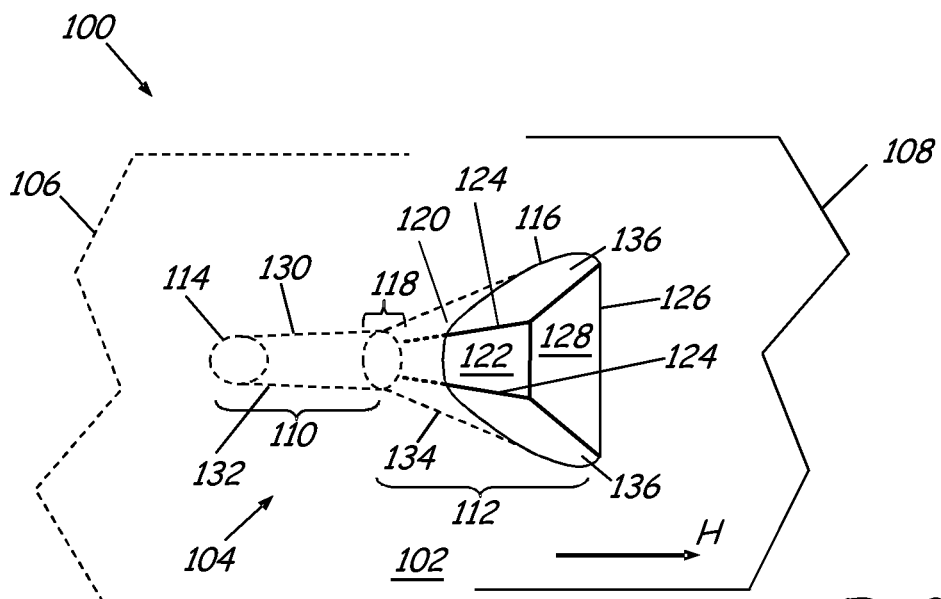
FIG. 5B is a schematic view of the gas path wall, illustrating an alternate cooling hole geometry in the outlet region.

FIG. 5B is a schematic view of gas path wall 102, illustrating an alternate geometry for diffusing section 112 of cooling hole 104. In this configuration, longitudinal ridges 124 extend from transition 118 to terminate at planar transition region 128. Planar transition region 128 is without longitudinal ridges 124, and coextends with downstream surface 122 of cooling hole 104, from the downstream end of longitudinal ridges 124 to trailing edge 126 of outlet 116.

Transition region 128 of outlet portion 112 eliminates cusps along trailing edge 126, further reducing flow separation for improved cooling performance along second surface 108 of gas path wall 102. The dimensions of longitudinal ridges 124 are selected to discourage swirl, as described above, and the dimensions of transition region 128 are selected to improve flow uniformity along trailing edge 126.

The overall geometry of cooling hole 104 thus varies, as described above, and as shown in the figures. The design of inlet 114 and outlet 116 may also vary, including various circular, oblate, oval, crescent, trapezoidal, triangular, cusped and delta shaped profiles with arcuate, curved, angular or piecewise linear upstream surfaces 120 extending to straight or convex trailing edges 126. The configuration of cooling hole 104 is not limited to these particular examples, moreover, but also encompasses different combinations of the various features that are shown, including metering sections 110 and transitions 118 with a variety of different circular, elliptical, oblong and cusped cross sections, and diffusing sections 112 with one, two or three lobes 136, in combination with different transition regions 128.

The cross sectional shape of cooling hole 104 may also vary, for example along metering section 110 between inlet 114 and transition 118, within transition 118, or along diffusing section 112 between transition 118 and outlet 116. In particular, different portions of metering section 110 may have circular, longitudinal oval, or transverse oval cross sections, as taken across axis A, or an oblong or delta shape, for examples as shown for outlet 116.

Figure 6:
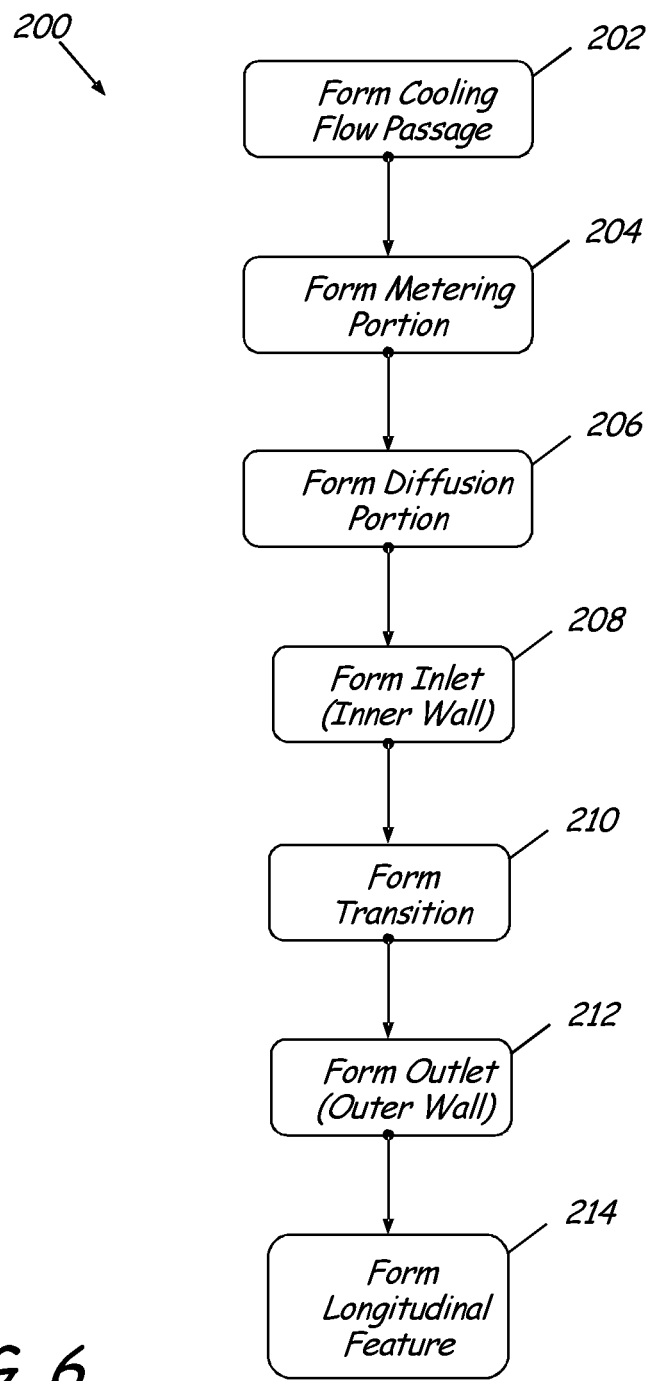
FIG. 6 is a block diagram of a method for forming a cooling hole in a gas turbine engine component.

FIG. 6 is a block diagram illustrating method 200 for forming a cooling flow passage through the gas path wall of a gas turbine engine component. For example, method 200 may be used to form cooling hole 60 or cooling hole 104 in an airfoil, casing, liner, combustor, augmentor or turbine exhaust component, as described above. Method 200 includes forming a cooling hole in a gas path wall of the component (step 202), forming a metering section in the cooling hole (step 204), and forming a diffusing section adjacent the metering section (step 206).

Forming a cooling hole in the gas path wall (step 202) includes forming an inlet (step 208) in a first surface of the gas path wall, and extending the cooling hole through a transition (step 210) to an outlet (step 212) in the second surface of the gas path wall. These steps may be performed in any order, depending on component geometry, for example by forming the passage starting from the outlet in the outer wall (step 212), through the transition (step 210) and to the inlet in the inner wall (step 208). Alternatively, the inlet and outlet may be formed (steps 208 and 212) in a single drilling or manufacturing process, and the transition may be formed while extending the metering section (step 204) from the inlet, or while extending the diffusing section (step 206) from the outlet, as described below.

Forming a metering section (step 204) includes extending the cooling hole from the inlet (at the first surface) to the transition. The metering section is convergent in a first direction from the inlet to the transition, and divergent in a second direction from the inlet to the transition. The convergence and divergence are selected so that the flow area of the passage decreases or remains substantially constant from the inlet through the metering section to the outlet, in order to regulate the cooling fluid flow for improved efficiency. This convergence and divergence of the metering section can be formed by first laser drilling the metering section and then coated. The coating can be deposited in the metering section such that certain portions of the metering section receive more coating deposition than other portions of the metering section. Thus, the metering section can converge in a first direction and diverge in a second direction.

The first and second directions may be longitudinal or transverse with respect to hot gas flow along the second surface of the gas path wall. In addition, the upstream wall of the cooling hole can be substantially straight from the inlet through the transition to the outlet. The downstream wall of the cooling hole may converge toward the upstream wall, in the region from the inlet through the metering section to the transition.

Forming a diffusing section (step 206) includes extending the cooling hole from the transition to the outlet (at the second surface). The diffusing section is convergent in both the first and second directions. Thus, the flow area of the cooling hole increases from the transition through the diffusing section to the outlet, in order to improve cooling fluid distribution and cooling performance. In some methods, longitudinal features are formed (step 214) in the diffusing section, as described above, dividing the outlet portion of the flow passage into lobes in order to discourage swirl and reduce losses.

The gas turbine engine components, gas path walls and cooling holes described herein can thus be manufactured using one or more of a variety of different processes. These techniques provide each cooling hole with its own particular configuration and features, including, but not limited to, inlet, metering, transition, diffusion, outlet, upstream surface, downstream surface, lateral surface, longitudinal, lobe and downstream edge features, as described above. In some cases, multiple techniques can be combined to improve overall cooling performance or reproducibility, or to reduce manufacturing costs.

Suitable manufacturing techniques for forming the cooling configurations described here include, but are not limited to, electrical discharge machining (EDM), laser drilling, laser machining, electrical chemical machining (ECM), water jet machining, casting, conventional machining and combinations thereof. Electrical discharge machining includes both machining using a shaped electrode as well as multiple pass methods using a hollow spindle or similar electrode component. Laser machining methods include, but are not limited to, material removal by ablation, trepanning and percussion laser machining. Conventional machining methods include, but are not limited to, milling, drilling and grinding.

The gas flow path walls and outer surfaces of some gas turbine engine components include one or more coatings, such as bond coats, thermal barrier coatings, abrasive coatings, abradable coatings and erosion or erosion-resistant coatings. For components having a coating, the inlet, metering section, transition, diffusing section and outlet cooling features may be formed prior to a coating application, after a first coating (e.g., a bond coat) is applied, or after a second or third (e.g., interlayer) coating process, or a final coating (e.g., environmental or thermal barrier) process. Depending on component type, cooling hole or passage location, repair requirements and other considerations, the diffusing section and outlet features may be located within a wall or substrate, within a thermal barrier coating or other coating layer applied to a wall or substrate, or combinations thereof. The cooling geometry and other features may remain as described above, regardless of position relative to the wall and coating materials or airfoil materials.

In addition, the order in which cooling features are formed and coatings are applied may affect selection of manufacturing techniques, including techniques used in forming the inlet, metering section, transition, outlet, diffusing section and other cooling features. For example, when a thermal barrier coat or other coating is applied to the second surface of a gas path wall before the cooling hole or passage is produced, laser ablation or laser drilling may be used. Alternatively, either laser drilling or water jet machining may be used on a surface without a thermal barrier coat. Additionally, different machining methods may be more or less suitable for forming different features of the cooling hole, for example different laser and other machining techniques may be used for forming the outlet and diffusion features, and for forming the transition, metering and inlet features.

While the invention is described with reference to exemplary embodiments, it will be understood by those skilled in the art that various changes may be made and equivalents may be substituted without departing from the spirit and scope of the invention. In addition, different modifications may be made to adapt the teachings of the invention to particular situations or materials, without departing from the essential scope thereof. The invention is thus not limited to the particular examples disclosed herein, but includes all embodiments falling within the scope of the appended claims.

DISCUSSION OF POSSIBLE EMBODIMENTS

The following are non-exclusive descriptions of possible embodiments of the present invention.

A component for a gas turbine engine can include a gas path wall having a first surface and a second surface and a cooling hole extending through the gas path wall from the first surface to the second surface. The cooling hole can include an inlet portion having an inlet at the first surface, an outlet portion having an outlet at the second surface, and a transition defined between the inlet and the outlet. The inlet portion can converge in a first direction from the inlet to the transition and diverge in a second direction from the inlet to the transition. The outlet portion can diverge at least in one of the first and second directions from the transition to the outlet.

The component of the preceding paragraph can optionally include, additionally and/or alternatively any, one or more of the following features, configurations and/or additional components:

the inlet portion of the cooling hole can have an oblong geometry;

cross-sectional area of the cooling hole can decrease or remain constant from the inlet to the transition;

cross-sectional area of the cooling hole can increase from the transition to the outlet;

the first direction can be a longitudinal direction with respect to gas flow along the second surface and the second direction can be a transverse direction with respect to the gas flow along the second surface;

the first direction can be a transverse direction with respect to gas flow along the second surface and the second direction can be a longitudinal direction with respect to the gas flow along the second surface;

the cooling hole can be inclined in a downstream direction with respect to gas flow along the second surface of the gas path wall;

the cooling hole can have a substantially straight upstream surface extending from the inlet through the transition to the outlet;

the cooling hole can have a convergent downstream surface extending from the inlet to the transition and a divergent downstream surface extending from the transition to the outlet;

a longitudinal ridge can be formed on a downstream surface of the outlet portion between the transition and the outlet, wherein the longitudinal ridge divides the outlet portion into lobes;

a transition region can extend between the longitudinal ridge and a trailing edge of the outlet; and/or the second surface can form a pressure surface, a suction surface or a platform surface of an airfoil.

An airfoil can include a wall having a first surface and a second surface that is exposed to hot working fluid flow. A cooling hole can include a metering section having an inlet at the first surface, a diffusing section having an outlet at the second surface, and a transition defined between the inlet and the outlet. The metering section can converge in a first direction from the inlet to the transition, and diverge in a second direction from the inlet to the transition. The diffusing section can diverge at least in one of the first and second directions from the transition to the outlet.

The airfoil of the preceding paragraph can optionally include, additionally and/or alternatively any, one or more of the following features, configurations and/or additional components:

the first direction can be a longitudinal direction with respect to the hot working fluid flow and the second direction can be a transverse direction with respect to the hot working fluid flow; and/or longitudinal ridges can be formed on a downstream wall of the diffusing section, and the longitudinal ridges can extend between the transition and the outlet and dividing the diffusing section into lobes.

A gas turbine engine component can include a gas path wall having a first surface and a second surface and a cooling hole extending through the gas path wall. The cooling hole can have an inlet portion with an inlet in the first surface, an outlet portion with an outlet in the second surface, and a transition defined between the inlet portion and the outlet portion. A first cooling hole surface can extend along the cooling hole. The first cooling hole surface can be substantially straight from the inlet through the transition to the outlet. A second cooling hole surface can extend along the cooling hole opposite the first cooling hole surface. The second cooling hole surface can converge toward the first cooling hole surface from the inlet to the transition and diverge away from the first cooling hole surface from the transition to the outlet.

The component of the preceding paragraph can optionally include, additionally and/or alternatively any, one or more of the following features, configurations and/or additional components:

flow area of the inlet portion can decrease or remain constant between the inlet and the transition, and flow area of the outlet portion can increase between the transition and the outlet;

the first cooling hole surface can be an upstream surface with respect to hot gas flow along the second surface of the gas path wall and the second cooling hole surface can be a downstream surface with respect to the hot gas flow; and/or a longitudinal ridge can be formed on the downstream surface between the transition and the outlet, and the longitudinal ridge can divide the outlet portion into lobes.

A component for a gas turbine engine can include a flow path wall having a first surface and a second surface. The first surface can be exposed to cooling fluid and the second surface can be exposed to hot working fluid. A cooling hole can include a metering section having an inlet at the first surface, a diffusing section having an outlet at the second surface, and a transition defined between the inlet and the outlet. An upstream surface of the cooling hole can be substantially straight from the inlet to the outlet. A downstream surface of the cooling hole can converge toward the upstream surface from the inlet to the transition and diverge away from the upstream surface from the transition to the outlet.

The component of the preceding paragraph can optionally include, additionally and/or alternatively any, one or more of the following features, configurations and/or additional components:

first and second lateral side surfaces of the cooling hole can diverge from the inlet to the transition;

divergence of the first and second lateral side surfaces can be selected such that the cross sectional area of the metering section does not increase from the inlet to the transition;

divergence of the first and second lateral side surfaces can be selected such that cross sectional area of the metering section decreases from the inlet to the transition;

a ridge can extend along the downstream surface of the cooling hole in the diffusing section, and can divide the diffusing section of the cooling hole into lobes; and/or a transition region can extend from the ridge to a trailing edge of the outlet.

The invention claimed is:

1. A component for a gas turbine engine, the component comprising: a gas path wall having a first surface and a second surface; and a cooling hole extending through the gas path wall from the first surface to the second surface, the cooling hole comprising an inlet at the first surface, an outlet at the second surface, a transition defined between the inlet and the outlet, an inlet portion extending from the inlet to the transition, and an outlet portion extending from the transition to the outlet; wherein the inlet portion converges in a first direction from the inlet to the transition and diverges in a second direction from the inlet to the transition; wherein the outlet portion diverges in both the first and second directions from the transition to the outlet; and wherein the first direction is a transverse direction with respect to gas flow along the second surface and the second direction is a longitudinal direction with respect to the gas flow along the second surface.

* * * * *